United States Patent [19]

Lanier et al.

[11] Patent Number: 4,944,902
[45] Date of Patent: Jul. 31, 1990

[54] POLYIMIDE COMPOSITIONS AND PROCESSES

[75] Inventors: Carroll W. Lanier, Baker, La.; Raymond Lee, Elk Grove Village, Ill.

[73] Assignee: Ethyl Corporation, Richmond, Va.

[21] Appl. No.: 456,512

[22] Filed: Dec. 26, 1989

[51] Int. Cl.$^5$ .............................................. H05B 1/00
[52] U.S. Cl. ...................... 264/25; 521/183; 521/184; 521/185; 521/189; 521/915; 521/50.5; 528/220; 528/229; 528/331; 528/341; 528/353
[58] Field of Search .............. 264/25; 521/183, 184, 521/185, 189, 50.5; 528/220, 229, 331, 341, 353

[56] References Cited

U.S. PATENT DOCUMENTS

| | | | |
|---|---|---|---|
| Re. 30,213 | 2/1980 | Gagliani et al. | 528/353 |
| 4,241,193 | 12/1980 | Gagliani | 521/99 |
| 4,315,077 | 2/1982 | Gagliani et al. | 521/77 |

*Primary Examiner*—Morton Foelak
*Attorney, Agent, or Firm*—Richard J. Hammond

[57] ABSTRACT

A copolyimide foam comprising the reaction product of one or more of an aromatic tetracarboxylic acid and a compound of the formula:

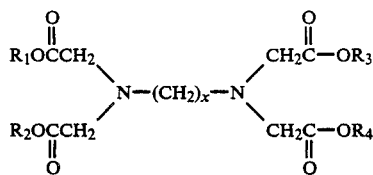

where x is an integer from 1 to 12 and $R_1$, $R_2$, $R_3$ and $R_4$ are the same or different and are hydrogen or $C_1$ to $C_6$ linear or branched alkyl a mixture thereof with two or more diamines at least one of which being a heterocyclic diamine having a nitrogen atom in the ring and the other being a para- or meta-substituted aromatic diamine free of aliphatic substitution.

Processes for producing the above copolyimide foam are also disclosed.

9 Claims, No Drawings

POLYIMIDE COMPOSITIONS AND PROCESSES

This invention relates to polyimide foams and methods of their preparation that provide superior physical properties because of the combination of reactants used there. More particularly, the present invention relates to novel polyimide foams which have improved properties by virtue of the incorporation of a copolymerizable reactant derived from an aliphatic diamine.

U.S. Pat. No. Re. 30,213, issued Feb. 12, 1980 and U.S. Pat. No. 4,241,193 issued Dec. 23, 1980 disclose hydrolytically stable copolyimide foams which are fire resistant and give off essentially no smoke or toxic fumes when they are heated to degradation temperatures. Consequently, those foams are useful in aircraft cabins, space vehicles, and land and sea transport and in a variety of other applications where human life or equipment might be endangered by the overheating of conventional, more flammable, smoke-emitting materials. These materials can be used, for example, in such applications, in fire containing walls and lightweight structures, to protect fuel tanks and heat sensitive systems, and as void filler materials and thermal, cryogenic, electrical and acoustical insulation.

U.S. Pat. No. 4,315,077 issued Feb. 9, 1982 discloses that superior polyimide foams can be prepared from, for example, solutions of a lower alkyl ester of 3,3',4,4'-benzophenone tetracarboxylic acid or a mixture of such esters, an aromatic diamine which is free of aliphatic moieties, a heterocyclic diamine, and an aliphatic diamine. Such aliphatic amines include alkylene diamines and alkylene ether diamines.

While the above compositions are noted to display a variety of improved properties over those of the prior art, i.e., greater fatigue resistance, durability, flexibility, resilience, etc. their poor performance in flammable environments leaves them as unlikely practical candidates for the uses mentioned above.

One important and primary object of this invention resides in the provision of a new family of polymers and compositions containing them which are fire resistant and which give off little or no smoke or toxic compounds when subjected to high temperature, oxidative degradation.

Another object of the present invention is to provide polymeric compositions which when formulated into foams have improved fire resistance, but at the same time retain their flexibility, fatigue resistance, durability and resiliency.

A further important object of this invention resides in the provision of novel, improved polymers which are terpolyimides derived from a benzophenone tetracarboxylic acid ester and an alkylene diamine-N,N'-tetraacetic acid ester and a combination of aromatic and heterocyclic diamines.

Still other important objects of the present invention reside in the provision of precursors for the polymers identified above and in the provision of processes for making those polymers and for converting the precursors to the corresponding polymers.

Certain objects of the present invention have been identified above. Other important objects and advantages and additional novel features of the invention will be apparent to those skilled in the relevant arts from the foregoing general description of the invention; from the appended claims; and from the following examples, which are intended to illustrate and not restrict the scope of the invention.

The polyimide precursors used in the practice of this invention can vary widely in composition. In general, they are composed of a mixture comprising at least (i) two organic tetracarboxylic acids or derivatives thereof, and (ii) one or more organic diamines co-reactive therewith, preferably an aromatic or heterocyclic or primary diamine. Components (i) and (ii) are usually present in the mixture in essentially stoichiometric quantities.

The organic tetracarboxylic acids or derivatives thereof are preferably based on tetracarboxylic acids having the general formula:

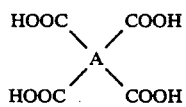

wherein A is a tetravalent organic group.

One of those tetra carboxylic acids having the general formula shown above are the aliphatic tetracarboxylic acids of the formula

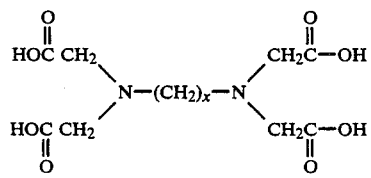

where x is an integer from 1 to 12 as well as the lower alkyl esters, i.e., the $C_1$ to $C_6$ linear or branched alkyl esters and dianhydride thereof. Where esters are used, tetra-substituted esters are satisfactory for the preparation of the foams of this invention. While tri-, di- and mono-substituted lower alkyl esters are also useful, the preferred compounds of the above formula are those having two ester substituents preferably located on acetic carboxylic acid groups substituted on different nitrogen atoms.

Mixtures of the compounds having the above formula but where x is 1 or more are also useful in preparing the polyimide foams of this invention.

Another group of tetravalent carboxylic acids having the general formula shown above are those preferably having one of the following structures:

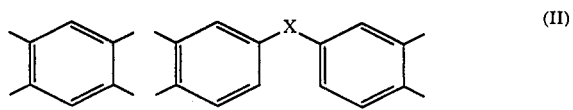

wherein X is one or more the following:

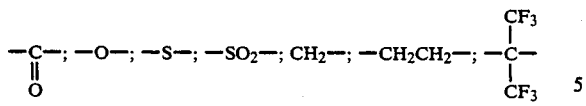

Preferred among the tetracarboxylic acid esters are the alkyl esters of 3,3',4,4'-benzophenone tetracarboxylic acid, most preferably the lower ($C_1$ to $C_6$) alkyl diesters thereof. Mixtures of two or more aromatic esters, most preferably predominating in diesters, may be employed, if desired.

It is also possible, in accordance with this invention, that the tetracarboxylic acid derivatives (Compounds I and II) employed in the manufacture of the polyimide foams herein be a caprolactam as taught by U.S. Pat. Nos. 4,161,477, 4,183,838 and 4,183,839, the disclosures of which are incorporated herein by reference.

Tetracarboxylic acid derivatives used in the manufacture of the initial polyimide foams employed in the practice of this invention may also be N-substituted imido acid esters of the tetracarboxylic acids of Compounds I and II as taught by U.S. Pat. Nos. 4,647,597 and 4,656,198, the disclosures of which are incorporated herein by reference. As described in those patents, the N-substituted imido acid esters may be formed by reacting an aromatic tetracarboxylic acid dianhydride with an amino acid and an alcohol or mixture of alcohols. As further taught in those patents, on reaction of the imido acid ester with the diamine or diamines, the acid ester group bonded to the nitrogen atom of the N-substituted imido acid ester is displaced so that the desired polyimide is formed.

The organic diamines with which the foregoing mixture of tetracarboxylic acids or derivatives is employed may be represented by the formula:

$$H_2N-R'-NH_2$$

wherein R' is an aromatic group containing 5 to 16 carbon atoms which may contain up to one hetero atom in the ring, the hetero atom being nitrogen, oxygen or sulfur. Also included are aromatic groups such as:

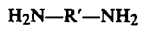

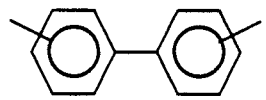

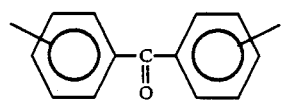

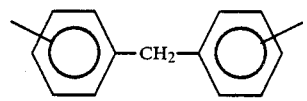

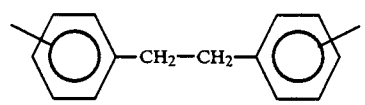

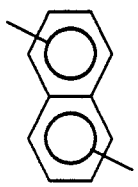

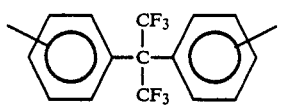

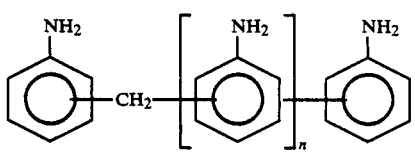

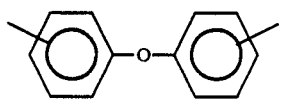

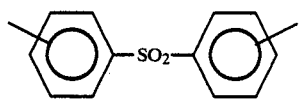

Representatives of such diamines include:
2,6-diaminopyrodine;
3,5-diaminopyridine;
3,3'-diaminodiphenylsulfone;
4,4'-diaminodiphenylsulfone;
4,4'-diaminodiphenylsulfide;
3,3'-diaminodiphenylether;
4,4'-diaminodiphenylether;
meta-phenylenediamine;
para-phenylenediamine;
4,4'-methylene dianiline;
2,6-diamino toluene;
2,4-diamino toluene; and the like.

It is also possible and sometimes desirable in the preparation of the polyimide precursors, to include in the reaction mixture one or more aliphatic diamines. Such aliphatic diamines are preferably alpha-omega diaminoalkanes having the formula $$H_2N-(CH_2)_n-NH_2 \qquad (III)$$

wherein n is an integer from 2 to 16. Representatives of such diamines include 1,3-diaminopropane, 1,4-diaminobutane, 1,5-diaminopentane, 1,6-diaminohexane, etc.

In place of or in addition to the foregoing aliphatic amines, use can be made of aliphatic esterified polyamines such as polyoxypropylene amines having the formula:

$$H_2N-CH(CH_3)CH_2-]OCH_2CH(CH_3)]_x-NH_2 \qquad (IV)$$

wherein x varies from about 1 to about 5 carbon atoms.

Other useful primary diamines which may be included in the foams used in the practice of this invention include amino-terminated butadiene-nitrile copolymers having the general formula:

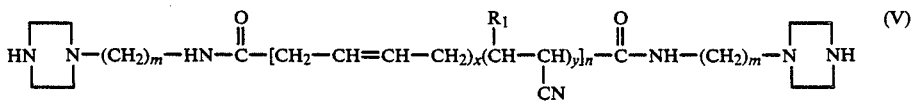

wherein R is a phenylene group or an alkylene group, $R_1$ is hydrogen or methyl, x and y are each independently integers ranging from 1 to 25 and n is an integer, preferably below 20. In these copolymers it is preferred that butadiene constitute at least 50% by weight of the butadiene and nitrile monomer. The nitrile monomer copolymerized with the butadiene can either be acrylonitrile or methacrylonitrile. Such copolymers generally have low molecular weights, preferably less than 3,000 to insure that they are sufficiently fluid to react in the formation of the polyimide as well as sufficiently fluid so as to be capable of foaming.

Still another type of primary diamine which may be included in the polyimide foams used in this invention are the aromatic amino-terminated silicones, such as those having the general formula:

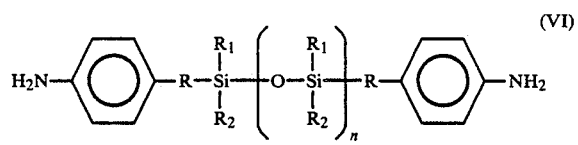

wherein R is a $C_2$ to $C_6$ alkylene group, $R_1$ and $R_2$ are each independently lower alkyl containing 1 to 3 carbon atoms and n is an integer from 1 to 4.

Another preferred category of diamines which may be utilized in forming the foams for use in this invention are the diesters of amino-substituted aromatic carboxylic acids and polymethylene glycols. Such diesters may be represented by the general formula:

$$H_2N-ArCOO-R-OOCAr-NH_2 \qquad (VII)$$

wherein R is an alkylene group (which may be linear or branched and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups.

A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;
tetramethylene glycol-3-amino-4-nitrobenzoic acid diester;
tetramethylene glycol-3-amino-5-nitrobenzoic acid diester
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester;
and the like. Mixtures of such diesters may be employed.

A particularly preferred diester of this type is the diester of trimethylene glycol (1,3-propanediol) and 4-aminobenzoic acid.

In the practice of this invention the organic tetracarboxylic acids are preferably used in the form of their diesters, most preferably the methyl or ethyl diesters. These esters are reacted with the above-referred-to amine(s) to form a prepolymer in the form of a consolidated, fragile foam structure, which is then subjected to additional heating in order to effect imide formation and thereby cure the polymer. This operation can be conducted either in the presence or absence of an added blowing agent to provide the desired polyimide foam.

The relative proportions used in the preparation of the polyimides can be varied. In general, it is preferred to employ essentially stoichiometric proportions between the mixture of tetracarboxylic acids or derivatives thereof and the primary diamine(s). However, non-stoichiometric mixtures can be used although the reactants present in excess usually do not participate in the reaction.

About 1 to about 40 mol percent (preferably about 10 to about 30 mol percent, most preferably about 20 mol percent) of the combination of tetracarboxylic acids or derivatives thereof employed is composed of one or more tetracarboxylic acids of formula I or their derivatives. The amine component is preferably composed of one or more aromatic or heterocyclic diamine(s) with or without the addition of still other diamines, for example diamines of the type referred to hereinabove in Formulas III, IV, V, VI and VII, or any mixture thereof. Usually the overall combination of amines will contain no more than about 10 mol percent of the diamines of Formulas III, IV, V, and VI. In the case of diamines of Formula VII, these may comprise up to about 40 mol percent of the mixture of diamines used.

In accordance with one preferred form of the invention, use is made of a combination of aromatic amines, one of which is a nitrogen heterocyclic diamine, preferably 2,6-diaminopyridine and/or 3,5-diaminopyridine, while the other is a diamine containing two benzene rings, preferably 4,4'-methylenedianiline and/or 4,4'oxydianiline. When using a combination of aromatic amines in accordance with this concept, the mol ratio of the non-heterocyclic diamine to the heterocyclic diamine is within the range of 1.0 to 3.0, and preferably 1.5 to 2.8.

When using a lower alkyl ester of the tetracarboxylic acids, the resulting alcohol produced from the reaction as well as the water released during the reaction can be used as the blowing agent during polymerization to form the desired polyimide foams. Alternatively, use can be made of any of a variety of organic or inorganic blowing agents. By use of a solid blowing agent such as Celogen TSH, Celogen TO, Celogen AZ 130, Celogen RA, Celogen HT 500, Celogen HT 500, sodium bioarbonate, benzenesulfonyl hydrazide, boric acid, and Expandex 5 PT of controlled particle size, the homogeneity of the cellular structure of the resulting polyimide foam can be more accurately controlled. Preferred for such use are solid blowing agents which have been subjected to ball milling or other grinding so that the blowing agent is less than 200 microns in diameter, with 98 percent of the blowing agent particle sizes being less than 150 microns in diameter.

The chemical compositions of the preferred organic blowing agents identified by trade name includes the following:

| Blowing Agent | Chemical Composition |
| --- | --- |
| Celogen TSH | toluenesulfonyl hydrazide |
| Celogen OT | p,p'-oxybis(benzenesulfonyl hydrazide) |
| Celogen AZ 130 | azodicarbonamide |
| Celogen RA | p-toluenesulfonyl semicarbazide |
| Celogen HT 500 | a modified hydrazine derivative |
| Celogen HT 550 | hydrazol dicarboxylate |
| Expandex 5 PT | 5-phenyltetrazole |

Variations in the concentration of the blowing agent can be used to achieve specific densities and ILD values. Concentrations of up to 10 percent based on the weight of the polyimide precursor, and preferably 1 to 5 percent, can be employed. A concentration of about 2.5 weight percent is particularly preferred.

Hydrated organic compounds of the type referred to in U.S. Pat. No. 4,621,015 may also be used as blowing agents in the process.

In the practice of this invention, it is possible to include in the reaction mixture various filler and/or reinforcing materials. For example, graphite, glass and other synthetic fibers can be added to the composition to produce a fiber-reinforced product. Microballoons may be added for density adjustment, if desired. It is frequently desirable to employ a surfactant thereby increasing cellular structure stability and uniformity, and increase fatigue resistance and make the foam more flexible and resilient. The nature of such surfactants for this use is well known and reported in the patent literature.

Although not necessary, for some applications it is desirable to add a suitable quantity of a flame retardant material to the formulation in order to still further increase the flame resistance of the resultant foam.

In preparing the precursors of this invention, it is preferred to employ the procedures and spray drying techniques described in U.S. Pat. No. 4,296,208, the disclosure of which is incorporated herein by reference.

The temperatures at which the precursor is converted to the polyimide foam are generally those temperatures used in the preparation of other polyimide polymers. As a general rule temperatures ranging from 200° to 400° C. can be used, with heating times from 5 to 60 minutes or longer. As those skilled in the art will appreciate, the time for carrying out the reaction is somewhat dependent upon the reaction temperature, higher temperatures enabling the use of shorter reaction times. It is also possible to heat to a lower temperature in the first stage of the reaction and then to higher temperatures in the later stages.

Heating can be carried out in a conventional oven if desired. Alternatively, the foaming and curing of the precursor into a foamed polyimide polymer can be effected by means of microwave heating. In this technique, the precursor is exposed for 1 to 120 minutes to radio frequencies within the range of 915 to 2450 mHz, with the power output ranging from 1 to 100 kw. The power output to prepolymer weight ratio generally falls within the range of 0.1 to 10 kw per kg.

EXAMPLE 1

The following is an illustration of the best mode presently contemplated for the practice of this invention.

A run is conducted using 70 kg of a polyimide precursor powder in a microwave transparent mold using a microwave power input of 30 kw. The well-mixed powder is composed of 4,4'-methylenedianiline (MDA), 2,6-diaminopyridine (DAP), benzophenone tetracarboxylic acid dimethyl ester (BTDE) and ethylene diamine tetraacetic acid (EDTA) in the mol ratio of approximately 0.7 MDA:0.3 DAP :0.7 BTDE :0.3 EDTA. The powder is placed on an aluminum microwave curtailing shield ⅛ or ¼ inch thick positioned directly below the powder bed and covered by a temperature resistant cloth. The shield in turn rests upon a layer of polyimide foam thermal insulation. A plastic microwave impervious film rests on top of the powder. The artifact formed in the microwave-transparent mold (called a "bun") is removed therefrom and cured in a thermal oven at 500°–550° F. for 30 minutes. The yield of specification grade foam is significantly higher than a control run in which no EDTA is used.

EXAMPLE 2

The powder prepared as in Example 1, 100 g, and 3 g of ethylenediamine tetraacetic acid (EDTA) were placed in a ball mill with ceramic balls and rotated for 30 minutes. The mixed powder was then foamed in a microwave oven for 20 minutes (with one source on low) between a teflon-coated glass cloth slip sheet and a polyvinylchloride film (Reynolds 916-0.0005"). After microwave foaming, the bun was transferred to a thermal oven at 260° C. The post treatment was complete after 30 to 60 minutes.

A flexible foam was obtained from this Example which is more resilient than the foam prepared without EDTA. It is also more resistant to abrasion.

The foregoing disclosure has been presented for purposes of illustration and not limitation. As can readily be appreciated by those skilled in the art, this invention is susceptible to considerable variation in its practice within the spirit and scope of the ensuing claims.

We claim:

1. A process for preparing a copolyimide foam which includes heating a precursor composition comprising one or more of an aromatic tetracarboxylic acid and a compound of the formula I:

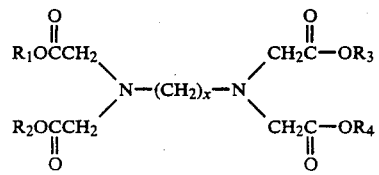

where x is an integer from 1 to 12 and $R_1$, $R_2$, $R_3$ and $R_4$ are the same or different and are hydrogen, $C_1$ to $C_6$ linear or branched alkyl or mixtures thereof with an aromatic or heteroaromatic diamine or mixture of said aromatic and heteroaromatic diamine.

2. The process according to claim 1 wherein the aromatic tetracarboxylic acid is 3,3',4,4'-benzophenone tetracarboxylic acid lower alkyl diester, x is 2 and $R_1$ and $R_3$ are hydrogen and $R_2$ and $R_4$ are lower alkyl.

3. The process according to claim 2 wherein the amount of Compound I is from about 1 to about 40 mole percent of the total amount of tetracarboxylic acid or derivative thereof used to prepare said copolyimide foam.

4. The process according to claim 1 wherein the foam is prepared by exposing the precursor composition to microwave radiation.

5. The process according to claim 4 wherein the exposure to microwave radiation is followed by a thermal post curing process.

6. A process for preparing a copolymeric foam which includes the steps of preparing a precursor composition comprising the admixture of (i) 3,3',4,4'-benzophenone tetracarboxylic acid lower alkyl diester and (ii) an N,N'-tetraacetic acid alkyl ester-substituted alkylene diamine with (iii) a heterocyclic diamine having a nitrogen hetero atom and (iv) an aromatic diamine that is meta- or para-substituted; said precursor comprising an equimole percent of each of the four components.

7. The process according to claim 6 wherein said precursor is a dry powder.

8. The process according to claim 7 wherein said N,N'-tetraacetic acid alkyl ester substituted alkylene diamine is ethylene diamine tetraacetic acid diethyl ester.

9. The process according to claim 8 wherein said heteroaromatic diamine is 2,6-diaminopyridine and said aromatic diamine is p,p'-methylenedianiline.

* * * * *